United States Patent [19]

Hirasa et al.

[11] Patent Number: 5,738,714
[45] Date of Patent: Apr. 14, 1998

[54] RECORDING LIQUID

[75] Inventors: Takashi Hirasa; Hiroshi Takimoto, both of Yokohama; Makoto Ishizu; Katsuji Honda, both of Chigasaki, all of Japan

[73] Assignee: Mitsubishi Chemical Corporation, Tokyo, Japan

[21] Appl. No.: 708,730

[22] Filed: Sep. 5, 1996

[30] Foreign Application Priority Data

Sep. 6, 1995 [JP] Japan ................... 7-229143

[51] Int. Cl.$^6$ ................... C09D 11/02
[52] U.S. Cl. ................... 106/31.9; 106/477; 106/476; 106/472
[58] Field of Search ................... 106/31.9, 477, 106/476, 472

[56] References Cited

U.S. PATENT DOCUMENTS

| | | | |
|---|---|---|---|
| 5,026,427 | 6/1991 | Mitchell et al. | 106/23 |
| 5,172,133 | 12/1992 | Suga et al. | 346/1.1 |
| 5,184,148 | 2/1993 | Suga et al. | 346/517 |
| 5,190,582 | 3/1993 | Shinozuka et al. | 106/472 |
| 5,542,969 | 8/1996 | Hirasa et al. | 106/20 C |

*Primary Examiner*—Melissa Bonner
*Attorney, Agent, or Firm*—Oblon, Spivak, McClelland, Maier & Neustadt, P.C.

[57] ABSTRACT

Disclosed is a recording liquid comprising a carbon black dispersed in an aqueous medium, which is characterized in that a toluene extract of the carbon black has an absorbance of 0.05 or less at λmax within the range of from 330 nm to 340 nm or at 337.5 nm when the toluene extract does not have λmax within the range of from 330 nm to 340 nm. The recording liquid can be used in ink-jet recording in high safety. During and after long storage of the recording liquid, the carbon black does not precipitate out. Using the recording liquid, reliable recording can be attained with good jettable durability of the liquid. Even when the recording liquid is recorded onto ordinary papers, high-quality images with good water-fastness and good light-fastness can be formed. The recording liquid is especially suitable for thermal ink-jet recording systems.

10 Claims, 1 Drawing Sheet

RECORDING LIQUID

BACKGROUND OF THE INVENTION

1. Field of the Invention

The present invention relates to a recording liquid comprising a carbon black dispersed in an aqueous medium, and also to an ink-jet recording method using the recording liquid, in particular, to a thermal ink-jet recording method.

2. Prior Art

Heretofore, an aqueous recording liquid comprising a water-soluble dye including, for example, acid dyes and direct dyes dissolved in an aqueous medium, or a solvent recording liquid comprising an oil-soluble dye dissolved in an organic solvent have been used as recording liquids in ink-jet recording.

The solvent recording liquid is problematic in the environmental safety because the organic solvent is volatile. Therefore, its use is limited, and, for example, it is not suitable for use in offices. On the other hand, the aqueous recording liquid comprising a water-soluble dye, is problematic in that, when it is recorded on a plain paper, the water-fastness of the recorded images is poor. In addition, both the solvent recording liquid and the aqueous recording liquid comprising the dyes are problematic in that the recorded images have poor light-fastness.

On the other hand, conventional recording liquids used in writing materials also have the same problems as those with such ink-jet recording liquids.

In order to overcome the above-mentioned problems, it has been proposed to use a carbon black as a colorant for recording liquids to give an image having good water-fastness and light-fastness, and some recording liquids comprising an aqueous dispersion of such a carbon black dispersed in an aqueous medium have been put to practical use. However, the conventional recording liquids comprising an aqueous dispersion of carbon black are still problematic in their jettability and durability.

The present invention is to provide a highly-reliable recording liquid which can be well recorded even on a plain paper by an ink-jet recording method to give thereon high-quality images having not only good water-fastness but also good light-fastness and which is highly safe and can be stably jetted out through ink-jetting orifices. In particular, one object of the present invention is to provide a recording liquid comprising an aqueous dispersion of a carbon black, which can be used in so-called ink-jet printers where thermal energy is applied to a recording liquid to thereby vary the state of the recording liquid prior to jetting out the recording liquid, such as thermal ink-jet printers which are referred to as bubble jets or thermal jets, while having excellent jetting durability for a long period of time (for example, in continuous recording of one hundred million dots) without forming any deposits on heating electrode plates where the recording liquid is heated just prior to being jetted out through orifices (the formation of such deposits is referred to as "kogation"), without causing clogging of heads of printers, and without causing the variation in the diameters of the droplets of the recording liquid being jetted out (the variation may be caused by the variation in the physical properties of the recording liquid itself being used). In addition, the recording liquid to be provided by the present invention is highly stable, even after having been stored for a long period of time.

SUMMARY OF THE INVENTION

We, the present inventors have found that a recording liquid comprising a carbon black, of which the ultraviolet absorbance within a particular range is not higher than a particular value, has excellent properties and is highly safe and, in addition, it has excellent jetting durability since the formation of deposits on heating electrode plates in a thermal jet-ink system where it is used (the formation is referred to as "kogation") is much reduced. On the basis of these findings, we have completed the present invention.

Accordingly, the subject matter of the present invention is to provide a recording liquid comprising a carbon black dispersed in an aqueous medium, which is characterized in that a toluene extract of the carbon black has an absorbance of 0.05 or less at the maximum absorption wavelength ($\lambda$max (nm)) within the range of from 330 to 340 nm or at 337.5 nm when the toluene extract does not have $\lambda$max within the range of from 330 to 340 nm.

DESCRIPTION OF PREFERRED EMBODIMENTS OF THE INVENTION

Figure 1:
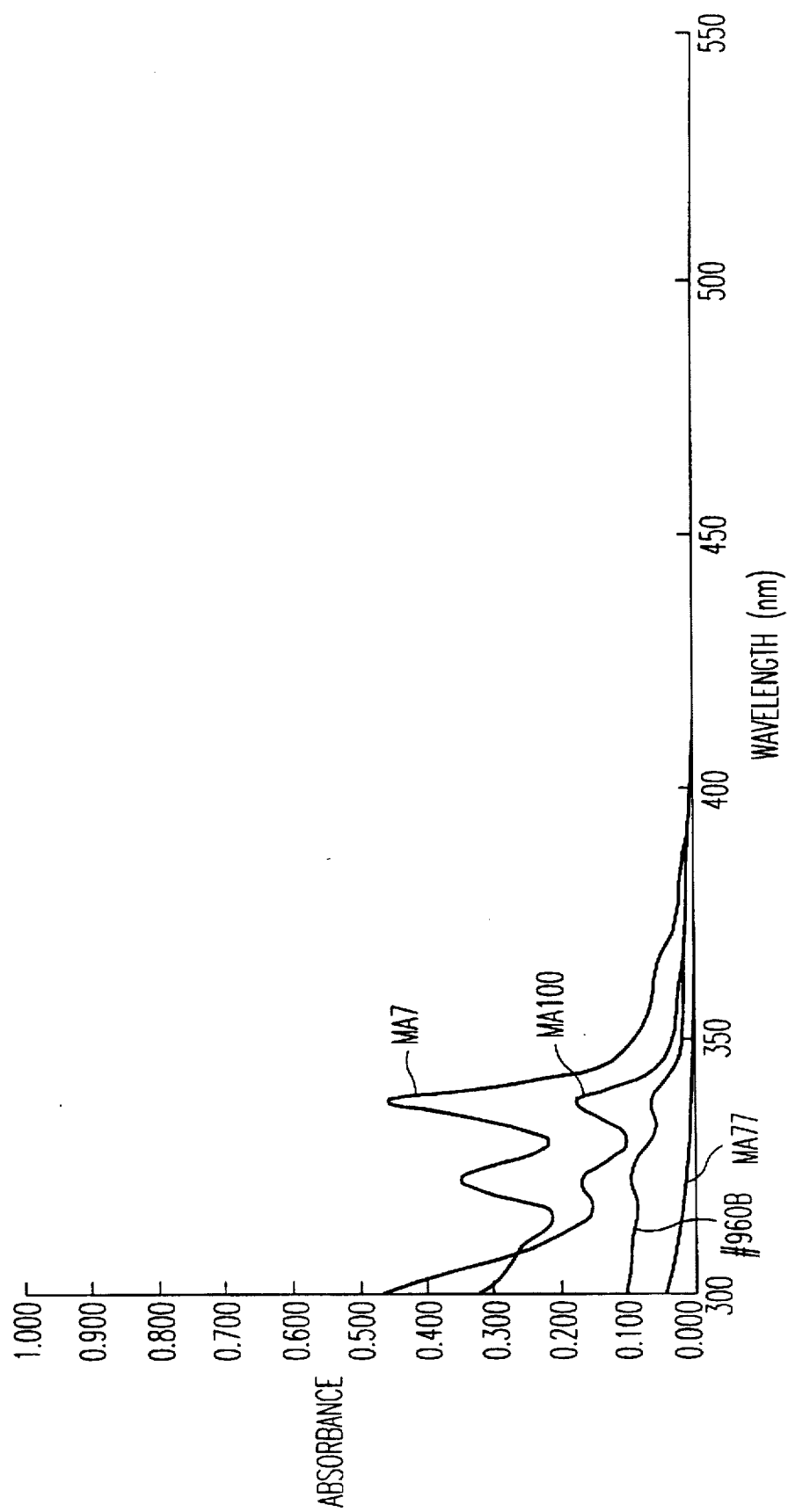
FIG. 1 is a graph, which shows the relationship between the absorption wavelength and the absorbance of some typical carbon black samples as used in the examples and comparative examples mentioned hereinafter.

The present invention is described in detail hereinunder.

The carbon black to be used in the present invention shall be such that "its toluene extract has an absorbance of 0.05 or less at the maximum absorption wavelength ($\lambda$max (nm)) within the range of from 330 to 340 nm or at 337.5 nm when the toluene extract does not have $\lambda$max within the range of from 330 to 340 nm", which means that, when the toluene extract of the carbon black has $\lambda$max within the range of from 330 to 340 nm, its absorbance must be 0.05 or less at its $\lambda$max, but when it does not have $\lambda$max within the range of from 330 to 340 nm, its absorbance must be 0.05 or less at 337.5 nm. The toluene extract of the carbon black for use in the present invention can be obtained as follows. Briefly, 30 ml of toluene (of a special grade chemical) is put into a 50-ml sample bottle, and 3 g of a carbon black is added thereto and shaken by hand for one minute. After this, the resulting liquid is filtered through a filter paper of No. 5C, and the filtrate thus obtained is referred to as a toluene extract of the carbon black. The thus-obtained toluene extract is put into a square, 1-cm quartz cell, and its absorbance is measured. (For the blank, toluene only is put into the cell, and its absorbance is measured.)

On the other hand, it is known that a carbon black, of which a toluene extract has an absorbance at $\lambda$max within the range of from 330 to 340 nm or has an absorbance at 337.5 nm, contains a large amount of PAH (polyaromatic hydrocarbons) typically including the compounds as shown in Table 1 below. However, it is unknown that the PAH components will have some influences on the characteristics of the recording liquid comprising the carbon black. In particular, it is not known at all that the presence of a larger amount of the PAH components in such a carbon black will result in the increase in the formation of deposits on electrode plates (kogation), thereby having negative influences on the jettability of the recording liquid comprising the carbon black. In addition, it is said that benzopyrene which is one typical example of the PAH components is carcinogenic, and it is desirable to reduce as much as possible the content of benzopyrene in the carbon black dispersed in recording liquids. However, no one has heretofore referred to the problem with the compound to be in a carbon black that may be used in recording liquids.

TABLE 1

Typical Examples of PAH to be in Carbon black

Naphthalene
(C₁₀H₈)
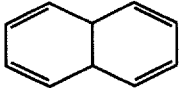

Acenaphthene
(C₁₂H₁₀)
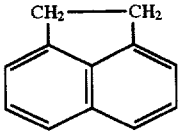

Fluorene
(C₁₃H₁₀)
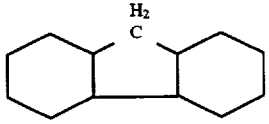

Phenanthrene
(C₁₄H₁₀)
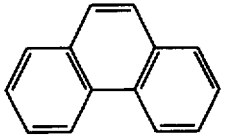

Anthracene
(C₁₄H₁₀)
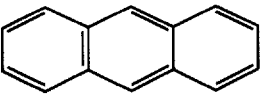

Fluoranthene
(C₁₆H₁₀)
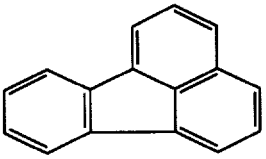

Pyrene
(C₁₆H₁₀)
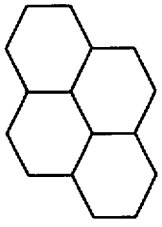

Benzo(a)anthracene
(C₁₈H₁₂)
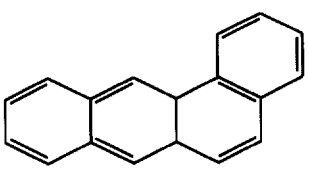

Chrysene
(C₁₈H₁₂)
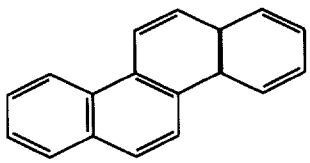

TABLE 1-continued

Typical Examples of PAH to be in Carbon black

Benzo(e)pyrene
(C₂₀H₁₂)
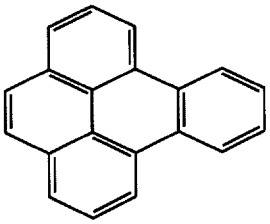

Benzo(b)fluoranthene
(C₂₀H₁₂)
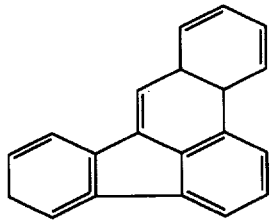

The recording liquid of the present invention comprising a carbon black, of which the toluene extract has an absorbance of 0.05 or less under the condition defined in the above, may have excellent characteristics, for example, when used in an ink-jet recording system, not only the safety of the recording is good, but also the kogation is inhibited or retarded. In particular, the absorbance of the toluene extract of the carbon black for use in the present invention is preferably 0.03 or less, more preferably 0.01 or less, since the kogation is more and more retarded.

It is desirable that the carbon black for use in the present invention has a volatile content of less than 5% by weight. The volatile content of a carbon black shall be measured according to the method of JIS K 6221. A carbon black having a volatile content of less than 5% by weight contains few components that may be dissolved out into an ink composition. Therefore, if the recording liquid of the invention comprises such a carbon black, it is advantageous in that its stability during storage is good. In particular, it is desirable that the carbon black for use in the present invention has a volatile content of less than 3.5% by weight.

It is also desirable that the carbon black of the type for use in the present invention is prepared according to a furnace method and, especially preferably, it is a furnace black.

It is also desirable that the carbon black to be in the recording liquid of the present invention has a primary particle size of from 10 to 100 nm, a DBP absorption of from 40 to 180 ml/100 g, and a pH of from 3 to 9. Especially preferably, the carbon black is such that its toluene extract has an absorbance of 0.03 or less at λmax within the range of from 330 to 340 nm or at 337.5 nm, its primary particle diameter is from 10 to 50 nm, and its DBP absorption is from 50 to 180 ml/100 g.

The carbon black dispersed in the recording liquid of the present invention may be a commercially-available one, including, for example, #25B, MA77 and MA100S (all trade names of products produced by Mitsubishi Chemical Co.). Also usable in the present invention is BLACK PEARLS 4750 (trade name), which is now commercially available from Cabot Specialty Chemicals Inc. for use in food-wrapping plastics. In addition, those to be prepared by chemically processing the above-mentioned carbon blacks (for example, oxidized carbon blacks, fluorinated carbon blacks), and also those to be prepared by physically or chemically bonding dispersants, surfactants and the like to them (for example, grafted carbons, dispersant-adsorbed carbon blacks) can also be used in the present invention.

Examples of carbon blacks usable in the present invention are shown in the upper rows of Table 2 below, along with λmax of their toluene extracts within the range of from 330 to 340 nm and the absorbance thereof at λmax; while some typical carbon blacks which are used in conventional recording liquids are shown in the lower rows thereof, along with λmax of their toluene extracts within the range of from 330 to 340 nm and the absorbance thereof at λmax. For the carbon blacks, of which the toluene extracts do not have λmax within the range of from 330 to 340 nm, the absorbance of their toluene extracts at 337.5 nm are shown in Table 2.

TABLE 2

| Carbon Black | λmax (nm) | Absorbance at λmax | Absorbance at 337.5 nm |
|---|---|---|---|
| MA77*[1] | — | — | 0.0058 |
| MA100S*[2] | — | — | 0.0253 |
| #25B*[3] | — | — | 0.0142 |
| Black Pearls 4750*[4] | — | — | 0.0374 |
| MA100*[5] | 337.5 | 0.1767 | same as the left |
| MA7*[6] | 337.5 | 0.4594 | same as the left |
| #960B*[7] | 337.5 | 0.0643 | same as the left |

*[1] to *[3], *[5] to *[7]: Trade names of carbon blacks produced by Mitsubishi Chemical Co.
*[4]: Trade names of carbon blacks produced by Cabot Specialty Chemicals Inc.

The relationship between the absorption wavelength and the absorbance of carbon blacks MA77, MA7, MA100 and #960B is shown in FIG. 1.

The specific physical data of the above-mentioned carbon blacks are shown in Table 3 below.

TABLE 3

| | Particle Size (nm) | Surface Area (m$^2$/g) | DBP Absorption (ml/100 g) | pH | Volatile Content (wt. %) |
|---|---|---|---|---|---|
| MA77 | 24 | 137 | 65 | 3.0 | 2.7 |
| #25B | 40 | 55 | 67 | 8.5 | 0.6 |
| MA100S | 22 | 134 | 100 | 3.5 | 1.5 |
| Black Pearls 4750*[4] | 16 | 234 | 121 | 6.9 | 1.5 |
| #960B | 16 | 250 | 66 | 8.0 | 1.5 |
| MA100 | 22 | 134 | 100 | 3.5 | 1.5 |
| MA7 | 24 | 137 | 65 | 3.0 | 3.5 |

The recording liquid of the present invention may not contain a dispersant but preferably contains it. The dispersant includes, for example, various anionic surfactants, nonionic surfactants, cationic surfactants, ampholytic surfactants and polymer surfactants.

The anionic surfactants include, for example, salts of fatty acids, alkylsulfates, alkylbenzenesulfonates, alkylnaphthalenesulfonates, alkylsulfosuccinates, alkyldiphenyl ether disulfonates, alkylphosphates, polyoxyethylene alkylsulfates, polyoxyethylene alkylarylsulfates, alkanesulfonates, naphthalenesulfonic acid-formalin condensates, polyoxyethylene alkylphosphates, and α-olefin (e.g., 8–20 carbon atoms)-sulfonates.

The nonionic surfactants include, for example, polyoxyethylene alkyl ethers, polyoxyethylene alkylaryl ethers, polyoxyethylene derivatives, oxyethylene-oxypropylene block copolymers, sorbitan fatty acid esters, polyoxyethylene sorbitan fatty acid esters, polyoxyethylene sorbitol fatty acid esters, glycerol fatty acid esters, polyoxyethylene fatty acid esters, and polyoxyethylene alkylamines.

The cationic surfactants and ampholytic surfactants include, for example, alkylamine salts, quaternary ammonium salts, alkylbetaines, and aminoxides. The polymer dispersants include, for example, polyacrylic acids, styrene/acrylic acid copolymers, styrene/acrylic acid/acrylate copolymers, styrene/maleic acid copolymers, styrene/maleic acid/acrylate copolymers, styrene/methacrylic acid copolymers, styrene/methacrylic acid/acrylate copolymers, styrene/half-maleate copolymers, styrene/styrene sulfonic acid copolymers, vinylnaphthalene/maleic acid copolymers, vinylnaphthalene/acrylic acid copolymers, and their salts.

The aqueous medium to be used in the recording liquid of the present invention consists essentially of water, but preferably comprises water along with a water-soluble organic solvent. The water-soluble organic solvent includes, for example, ethylene glycol, propylene glycol, butylene glycol, diethylene glycol, triethylene glycol, polyethylene glycol (having a molecular weight of approximately from 190 to 400), glycerol, alkyl ethers of the above-mentioned glycols, N-methylpyrrolidone, 1,3-dimethylimidazolinone, thiodiglycol, 2-pyrrolidone, sulfolane, dimethylsulfoxide, diethanolamine, triethanolamine, ethanol, and isopropanol. It is desirable to use water having few impurities, such as ion-exchanged water, distilled water, purified water, pure water, or ultra-pure water.

The carbon black, the dispersant and the organic solvent can be used singly in each but can be more preferably used as combined in each to produce better results.

In addition to the above-mentioned components, the recording liquid of the present invention may further contain, if desired, a water-soluble resin, an anti-fungal, a microbicide, a pH controlling agent, and an urea.

The carbon black content of the recording liquid of the present invention is generally from 1 to 10% by weight, preferably from 3 to 8% by weight, based on the total weight of the recording liquid. The dispersant content of the recording liquid is generally from 3 to 100% by weight, preferably from 5 to 50% by weight, based on the weight of the carbon black existing in the recording liquid. The water-soluble organic solvent content of the recording liquid is generally from 5 to 30% by weight, preferably from 10 to 20% by weight, based on the total weight of the recording liquid.

To prepare the recording liquid of the present invention, the ingredients that may constitute the recording liquid, such as those mentioned hereinabove, are mixed, and then the carbon black existing in the resulting mixture is attrited into fine particles and dispersed therein, using a dispersing machine. As the dispersing machine, usable is any of ball mills, roll mills, sand-grinding mills, as well as jet mills where solids can be milled in the absence of any media, such as Nanomizer (trade name, produced by Nanomizer Co.) and Ultimizer (trade name, produced by Dow Technology Co.). Of these, preferred are jet mills which are free from the introduction of any impurities that may results from media, into the milled particles. It is desirable that the mixture, after having been thus subjected to milling and dispersing operation, is filtered through a filtering machine or a centrifuger to thereby remove any coarse particles therefrom. If desired, the other components except the carbon black, the dispersant and water can be added to the mixture after the milling and dispersing operation. Since the milling and dispersing operation can be conducted more efficiently for the mixture having a higher carbon black concentration, it is desirable that the recording liquid of the present invention is prepared to have a high carbon black concentration and such a thick liquid thus prepared is finally diluted with an aqueous medium to thereby control the concentration of the recording liquid. Concretely, though depending on the type of the mill used, it is recommended that the milling of the carbon black in the mixture is effected at a concentration about 1.5 to 20 times higher than the concentration of the carbon black to be in the final recording liquid.

The recording liquid of the present invention can be used in ordinary writing materials but is preferably used in ink-jet printers.

Accordingly, another object of the present invention is to provide an ink-jet recording method where a recording liquid is jetted out through a fine orifice onto a material to be recorded to thereby produce an image on the material, which is characterized in that the recording liquid comprises a carbon black in an aqueous medium and that a toluene extract of the carbon black has an absorbance of 0.05 or less at λmax within the range of from 330 to 340 nm or at 337.5 nm when the toluene extract does not have λmax within the range of from 330 to 340 nm. In particular, the ink-jet recording method of the present invention is especially suitable to a thermal ink-jet recording system where thermal energy is applied to a recording liquid to thereby make the recording liquid jetted out onto a material to be recorded therewith.

As has been mentioned in detail and with reference to the preferred embodiments, the recording liquid of the present invention can be used in ink-jet recording in high safety. During and after long storage of the recording liquid of the present invention, the carbon black does not precipitate out. Therefore, using the recording liquid of the present invention, reliable recording can be attained with good jettable durability of the liquid. Even when the recording liquid of the invention is recorded onto ordinary papers, high-quality images with good water-fastness and good light-fastness can be formed. Therefore, the present invention is applicable not only to thermal ink-jet recording liquids but also to other various ink-jet recording liquids falling within a broad range and to recording liquids usable in writing materials.

EXAMPLES

The present invention is described in more detail by means of the following examples, which, however, are not intended to restrict the scope of the present invention. Without overstepping its spirit and subject matter, the present invention is not limited to only the illustrated examples.

Example 1

Preparation of Recording Liquid

| Ingredient | Amount (parts) |
|---|---|
| Glycerol | 16 |
| Ethylene Glycol | 18 |
| Riporan PB-800 (trade name of anionic surfactant, sodium α-olefinsulfonate, produced by Lion Co.) | 4 |
| Carbon Black MA77 (trade name, produced by Mitsubishi Chemical Co.) | 11 |
| Ion-exchanged Water | 51 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

Print Test

Using an ink-jet printer (trade name of BJ-10v, produced by Canon Co.), the recording liquid prepared as above was printed onto papers for electrophotography (trade code of 4024, produced by Xerox Co.) with stable and good print quality and little nozzle clogging. The printed characters showed excellent dot quality.

Evaluation of the Density of Printed Characters

The density of the printed characters was measured with a Macbeth densitometer (RD914). The results are shown in Table 4 mentioned below.

Water-fastness Test

The printed papers as obtained in the above-mentioned print test were dipped in city water in a beaker, for 5 seconds. After having been dried, the papers were visually observed as to the presence or absence of feathering and bleeding of the printed characters. The tested samples were ranked as follows, and the results are shown in Table 4 below.

A: Little feathering and bleeding.
B: Some feathering and bleeding with no problem in practical use.
C: Much feathering and bleeding.

Light-fastness Test

The printed papers were exposed to light for 100 hours, using a xenon fade meter (produced by Suga Shiken-ki KK), and then visually observed. The exposed samples were ranked as follows, and the results are shown in Table 4 below.

A: Good
B: Somewhat faded with no problem in practical use.
C: Much faded.

Storage Stability Test

The recording liquid was sealed in a Teflon (trade name) container and stored at 60° C. for 1 month. After thus stored, this was visually observed as to the presence or absence of gelation and precipitation. The tested samples were ranked as follows, and the results are shown in Table 4 below.

A: Little gelation and precipitation.
B: Slightly gelled and precipitated with no problem in practical use.
C: Much gelled and precipitated.

Kogation Test

Using a thermal ink-jet printer (trade name of BJ-10v, produced by Canon Co.), the recording liquid prepared as above was printed onto 25 sheets of paper for electrophotography (trade code of 4024, produced by Xerox Co.) to produce solid dot characters thereon in an area of 15 cm×25 cm. After the printing operation, the heating electrode plate in the printer used was gently washed with ion-exchanged water. After having been dried, the surface of the plate was observed with an optical microscope as to the presence or absence of deposits thereon. The results were ranked as follows, and shown in Table 4 below.

A: Only a few deposits formed with no problem in practical use.
B: Some deposits formed.
C: Many deposits formed.

Example 2

Preparation of Recording Liquid

| Ingredient | Amount (parts) |
| --- | --- |
| Glycerol | 16 |
| Ethylene Glycol | 18 |
| Polystar S2-1020 (trade name of anionic surfactant, Na salt of styrene/maleic acid copolymer, produced by Nippon Fats & Oils Co.) | 4 (as non-volatile content) |
| Carbon Black MA100S (trade name, produced by Mitsubishi Chemical Co.) | 11 |
| Ion-exchanged Water | 51 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 3

Preparation of Recording Liquid

| Ingredient | Amount (parts) |
| --- | --- |
| Glycerol | 16 |
| Ethylene Glycol | 18 |
| Polystar S2-1020 (trade name, produced by Nippon Fats & Oils Co.) | 4 (as non-volatile content) |
| Carbon Black MA77 (trade name, produced by Mitsubishi Chemical Co.) | 11 |
| Ion-exchanged Water | 51 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours, according to an ordinary method. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 4

Preparation of Recording Liquid

| Ingredient | Amount (parts) |
| --- | --- |
| Glycerol | 16 |
| Ethylene Glycol | 18 |
| Polystar OM (trade name of anionic surfactant, Na salt of diisobutylene/maleic acid copolymer, produced by Nippon Fats & Oils Co.) | 4 (as non-volatile content) |
| Carbon Black #25B (trade name, produced by Mitsubishi Chemical Co.) | 11 |
| Ion-exchanged Water | 51 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 5

Preparation of Recording Liquid

| Ingredient | Amount (parts) |
| --- | --- |
| Glycerol | 16 |
| Ethylene Glycol | 18 |
| Riporan PB-800 (trade name, produced by Lion Co.) | 4 |
| Carbon Black #25B (trade name, produced by Mitsubishi Chemical Co.) | 11 |
| Ion-exchanged Water | 51 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 6

Preparation of Recording Liquid

| Ingredient | Amount (parts) |
| --- | --- |
| Glycerol | 34 |
| Polystar OM | 4 |
| (trade name, produced by Nippon Fats & Oils Co.) | (as non-volatile content) |
| Carbon Black MA77 | 11 |
| (trade name, produced by Mitsubishi Chemical Co.) | |
| Ion-exchanged Water | 51 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 7

Preparation of Recording Liquid

| Ingredient | Amount (parts) |
| --- | --- |
| Glycerol | 10 |
| Diethylene Glycol | 10 |
| 2-Pyrrolidone | 6 |
| Polystar S2-1020 | 3 |
| (trade name, produced by Nippon Fats & Oils Co.) | (as solid content) |
| Black Pearls 4750 | 11 |
| (trade name, produced by Cabot Specialty Chemicals Inc.) | |
| Isopropyl Alcohol | 7 |
| Ion-exchanged Water | 53 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 8

Preparation of Recording Liquid

| Ingredient | Amount (parts) |
| --- | --- |
| Diethylene Glycol | 10 |
| N-methylpyrrolidone | 8 |
| Polystar S2-1020 | 3 |
| (trade name, produced by Nippon Fats & Oils Co.) | (as solid content) |
| Carbon Black MA77 | 9 |
| (trade name, produced by Mitsubishi Chemical Co.) | |
| Ethanol | 13 |
| Ion-exchanged Water | 57 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 9

Preparation of Recording Liquid

| Ingredient | Amount (parts) |
| --- | --- |
| Diethylene Glycol | 10 |
| Ethylene Glycol | 15 |
| Polystar S2-1020 | 3 |
| (trade name, produced by Nippon Fats & Oils Co.) | (as solid content) |
| Carbon Black MA77 | 11 |
| (trade name, produced by Mitsubishi Chemical Co.) | |
| N-propyl Alcohol | 6 |
| Ion-exchanged Water | 55 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 10

Preparation of Recording Liquid

| Ingredient | Amount (parts) |
| --- | --- |
| Glycerol | 16 |
| Ethylene Glycol | 29 |
| Polystar S2-1020 | 3 |
| (trade name, produced by Nippon Fats & Oils Co.) | (as solid content) |
| Carbon Black MA77 | 11 |
| (trade name, produced by Mitsubishi Chemical Co.) | |
| Ion-exchanged Water | 41 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 11

Preparation of Recording Liquid

| Ingredient | Amount (parts) |
| --- | --- |
| Glycerol | 16 |
| Ethylene Glycol | 18 |
| Riporan PB-800 | 1 |
| (trade name, produced by Lion Co.) | |
| Carbon Black MA77 | 9 |
| (trade name, produced by Mitsubishi Chemical Co.) | |
| Ion-exchanged Water | 56 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 12

Preparation of Recording Liquid

| Ingredient | Amount (parts) |
| --- | --- |
| Glycerol | 16 |
| Ethylene Glycol | 18 |
| Riporan PB-800 | 1 |
| (trade name, produced by Lion Co.) | |
| Black Pearls 4750 | 9 |
| (trade name, produced by Cabot Specialty Chemicals Inc.) | |
| Ion-exchanged Water | 56 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Example 13

Preparation of Recording Liquid

| Ingredient | Amount (parts) |
| --- | --- |
| Glycerol | 16 |
| Ethylene Glycol | 18 |
| Riporan PB-800 | 1 |
| (trade name, produced by Lion Co.) | |
| Carbon Black MA77 | 9 |
| (trade name, produced by Mitsubishi Chemical Co.) | |
| Ion-exchanged Water | 56 |
| Total | 100 |

The above-mentioned ingredients were put into a cylindrical, urethane resin-coated container as mounted on a sand grinder, and milled along with 152 parts of zirconia beads having a mean diameter of 0.5 mm, for 12 hours. The resulting dispersion was diluted with 127 parts of ion-exchanged water, stirred and then filtered under pressure through a filter paper of No. 5C. The resulting filtrate is used as a recording liquid.

The recording liquid thus prepared was subjected to the same print test (for evaluating the density of printed characters), water-fastness test, storage stability test, light-fastness test and kogation test as in Example 1. The results obtained are shown in Table 4.

Comparative Example 1

Preparation of Recording Liquid

A recording liquid was prepared in the same manner as in Example 1, except that a carbon black MA100 (produced by Mitsubishi Chemical Co.) was used in place of the carbon black MA77 used in Example 1.

This was subjected to the same print test (for evaluating the density of printed characters), water-fastness test, storage stability test, light-fastness test and kogation test as in Example 1. The results obtained are shown in Table 4.

Comparative Example 2

Preparation of Recording Liquid

A recording liquid was prepared in the same manner as in Example 1, except that a carbon black #960B was used in place of the carbon black MA77 used in Example 1.

This was subjected to the same print test (for evaluating the density of printed characters), water-fastness test, storage stability test, light-fastness test and kogation test as in Example 1. The results obtained are shown in Table 4.

TABLE 4

|  | Print density | Water-fastness Test | Storage Stability Test | Light-fastness Test | Kogation Test |
| --- | --- | --- | --- | --- | --- |
| Example 1 | 1.21 | A | A | A | A |
| Example 2 | 1.23 | A | A | A | A |
| Example 3 | 1.27 | A | A | A | A |
| Example 4 | 1.28 | A | A | A | A |
| Example 5 | 1.29 | A | A | A | A |
| Example 6 | 1.29 | A | A | A | A |
| Example 7 | 1.25 | A | A | A | B |
| Example 8 | 1.27 | A | A | A | A |
| Example 9 | 1.19 | A | A | A | A |
| Example 10 | 1.23 | A | A | A | A |
| Example 11 | 1.30 | A | A | A | A |
| Example 12 | 1.26 | A | A | A | B |
| Example 13 | 1.23 | A | A | A | A |
| Comp. Example 1 | 1.20 | A | A | A | C |
| Comp. Example 2 | 1.10 | A | A | A | C |

While the invention has been described in detail and with reference to specific embodiments thereof, it will be apparent to one skilled in the art that various changes and modifications can be made therein without departing from the spirit and scope thereof.

What is claimed is:

1. A recording liquid comprising a carbon black dispersed in an aqueous medium, which is characterized in that a toluene extract of the carbon black has an absorbance of 0.05 or less at λmax within the range of from 330 nm to 340 nm or at 337.5 nm when the toluene extract does not have λmax within the range of from 330 nm to 340 nm.

2. The recording liquid as claimed in claim 1, wherein the toluene extract of the carbon black has an absorbance of 0.03 or less at λmax within the range of from 330 nm to 340 nm or at 337.5 nm when the toluene extract does not have λmax within the range of from 330 nm to 340 nm.

3. The recording liquid as claimed in claim 1, wherein the toluene extract of the carbon black has an absorbance of 0.01 or less at λmax within the range of from 330 nm to 340 nm or at 337.5 nm when the toluene extract does not have λmax within the range of from 330 nm to 340 nm.

4. The recording liquid as claimed in claim 1, wherein the volatile content of the carbon black is less than 5%.

5. The recording liquid as claimed in claim 1, wherein the carbon black is a furnace black.

6. The recording liquid as claimed in claim 1, which contains a dispersant.

7. The recording liquid as claimed in claim 1, wherein the aqueous medium comprises water and a water-soluble organic solvent.

8. The recording liquid as claimed in claim 1, of which the carbon black content is from 1 to 10% by weight based on the total weight of the recording liquid.

9. An ink-jet recording method where a recording liquid is jetted out through a fine orifice onto a material to be recorded to thereby produce an image on the material, which is characterized in that the recording liquid comprises a carbon black dispersed in an aqueous medium and that a toluene extract of the carbon black has an absorbance of 0.05 or less at λmax within the range of from 330 nm to 340 nm or at 337.5 nm when the toluene extract does not have λmax within the range of from 330 nm to 340 nm.

10. The ink-jet recording method as claimed in claim 9, which is a thermal ink-jet recording system where thermal energy is applied to the recording liquid to thereby make the recording liquid jetted out onto a material to be recorded therewith.

* * * * *